United States Patent
Barrick et al.

(10) Patent No.: US 9,952,874 B2
(45) Date of Patent: *Apr. 24, 2018

(54) OPERATION OF A MULTI-SLICE PROCESSOR WITH SELECTIVE PRODUCER INSTRUCTION TYPES

(71) Applicant: International Business Machines Corporation, Armonk, NY (US)

(72) Inventors: Brian D. Barrick, Pflugerville, TX (US); Sundeep Chadha, Austin, TX (US); Maureen A. Delaney, Richmond, VT (US); Thao T. Doan, Austin, TX (US); Michael J. Genden, Austin, TX (US); Rokesh Jayasundar, Austin, TX (US); Dung Q. Nguyen, Austin, TX (US); David R. Terry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 244 days.

This patent is subject to a terminal disclaimer.

(21) Appl. No.: 15/046,569

(22) Filed: Feb. 18, 2016

(65) Prior Publication Data

US 2017/0168834 A1 Jun. 15, 2017

Related U.S. Application Data

(63) Continuation of application No. 14/969,588, filed on Dec. 15, 2015.

(51) Int. Cl.
  *G06F 9/30* (2006.01)
  *G06F 9/38* (2006.01)
  *G06F 13/40* (2006.01)

(52) U.S. Cl.
  CPC .......... *G06F 9/3851* (2013.01); *G06F 9/3001* (2013.01); *G06F 9/30043* (2013.01); *G06F 13/4068* (2013.01)

(58) Field of Classification Search
  CPC ..... G06F 9/3844; G06F 9/3828; G06F 9/3826
  See application file for complete search history.

(56) References Cited

U.S. PATENT DOCUMENTS 6,496,878 B1 * 12/2002 Azevedo ................. G06F 13/32
                                                                 710/15
2006/0095732 A1    5/2006 Tran et al.
(Continued)

FOREIGN PATENT DOCUMENTS

EP        000814582       12/1997

OTHER PUBLICATIONS

Butera et al., "Simultaneous Multithreading: Exploiting Instruction-Level and Thread-Level Parallelism in Microprocessors", Thesis, Apr. 25, 2011, 21 Pages, Haverford College, Haverford Pennsylvania.

(Continued)

*Primary Examiner* — Ernest Unelus
*Assistant Examiner* — Ronald Modo
(74) *Attorney, Agent, or Firm* — Brandon C. Kennedy; Robert R. Williams; Kennedy Lenart Spraggins LLP

(57) ABSTRACT

Operation of a multi-slice processor including execution slices and load/store slices, where the load/store slices are coupled to the execution slices via a results bus and the results bus includes segments assigned to carry results of a different instruction type, includes: receiving a producer instruction that includes an identifier of an instruction type and an identifier of the producer instruction, including storing the identifier of the instruction type and the identifier of the producer instruction in an entry of a register; receiving a source instruction dependent upon the result of the producer instruction including storing, in an issue queue, the source instruction, the identifier of the instruction type of the producer instruction, and an identifier of the producer (Continued)

instruction; and snooping the identifier of the producer instruction only from the segment of the results bus assigned to carry results of the instruction type of the producer instruction.

7 Claims, 6 Drawing Sheets

(56) References Cited

U.S. PATENT DOCUMENTS

| | | |
|---|---|---|
| 2006/0179346 A1 | 8/2006 | Bishop et al. |
| 2007/0198812 A1 | 8/2007 | Abernathy et al. |
| 2007/0204137 A1 | 8/2007 | Tran |
| 2010/0064121 A1 | 3/2010 | Alexander et al. |
| 2010/0332806 A1 | 12/2010 | Golla et al. |
| 2011/0078697 A1 | 3/2011 | Smittle et al. |
| 2013/0191651 A1* | 7/2013 | Muff .................. G06F 12/1027 713/193 |
| 2017/0168822 A1 | 6/2017 | Barrick et al. |

OTHER PUBLICATIONS

Appendix P; List of IBM Patents or Applications Treated as Related, Feb. 25, 2016, 2 pages.
Appendix P; List of IBM Patents or Applications Treated as Related, Feb. 26, 2016, 2 pages.

* cited by examiner

OPERATION OF A MULTI-SLICE PROCESSOR WITH SELECTIVE PRODUCER INSTRUCTION TYPES

CROSS-REFERENCE TO RELATED APPLICATION

This application is a continuation application of and claims priority from U.S. patent application Ser. No. 14/969,588, filed on Dec. 15, 2015.

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are described in this specification. Such multi-slice processors may include a plurality of execution slices and a plurality of load/store slices, where the load/store slices are coupled to the execution slices via a results bus and the results bus comprises a plurality of segments with each segment assigned to carry results of a different instruction type. Operation of such a multi-slice processor may include: receiving, from a dispatcher, a producer instruction, where the producer instruction includes an identifier of an instruction type and an identifier of the producer instruction wherein receiving the producer instruction further includes storing the identifier of the instruction type and the identifier of the producer instruction in an entry of a register; receiving, from the dispatcher, a source instruction, where the source instruction is dependent upon the result of the producer instruction and receiving the source instruction includes storing, in an issue queue, the source instruction, the identifier of the instruction type of the producer instruction, and an identifier of the producer instruction; and snooping the identifier of the producer instruction only from the segment of the results bus assigned to carry results of the instruction type of the producer instruction.

The foregoing aspects and features of the present disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
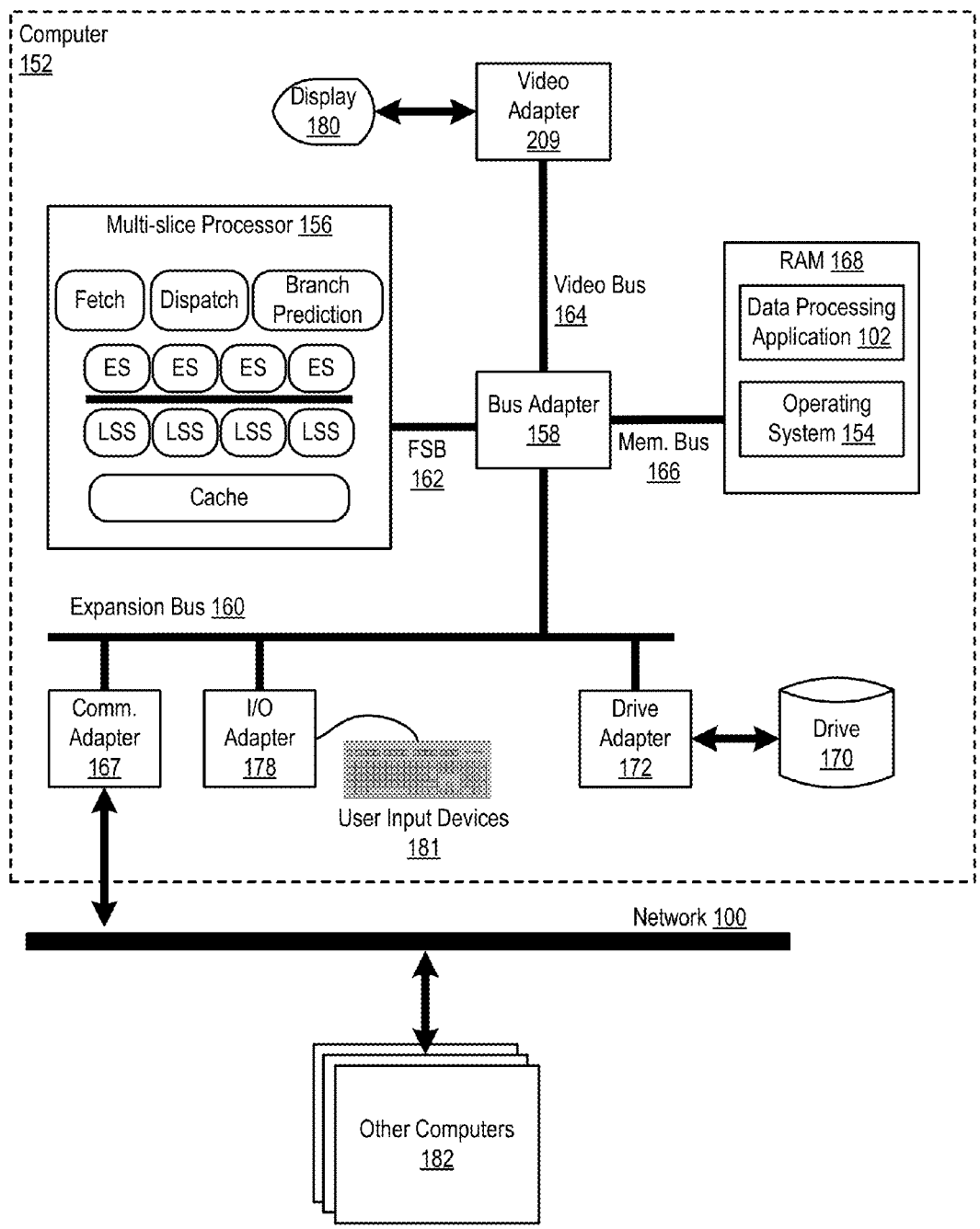
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
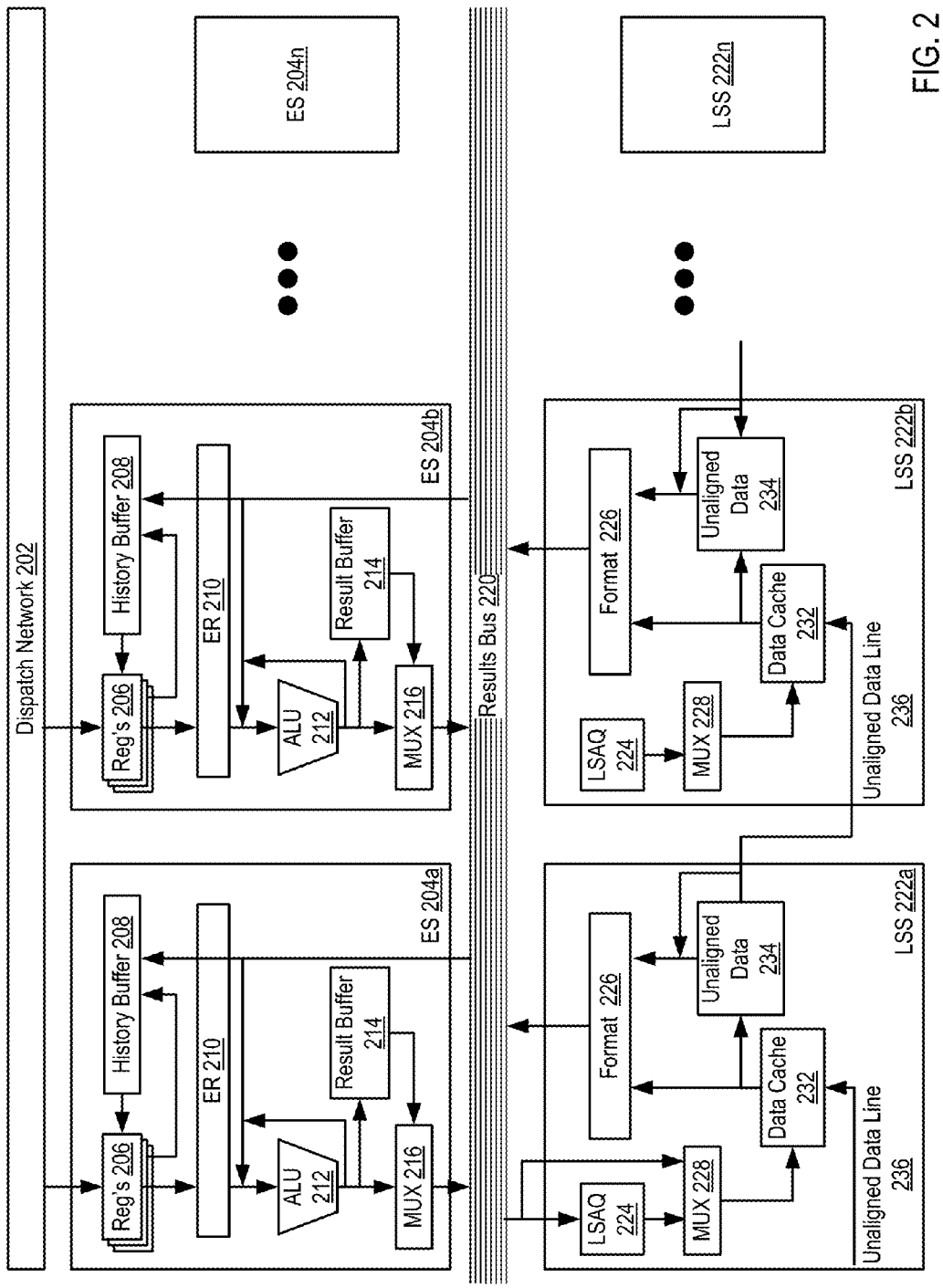
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction directed to a particular logical register and the result of the execution of the instruction. A logical register is an abstraction of a physical register that enables out-of-order execution of instructions that target the same physical register.

When a younger instruction directed to the same particular logical register is received, the entry in the general purpose register is moved to the history buffer. The history buffer (208) may be configured to store many instructions directed to the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit (212) or to a load slice (222a-222n) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
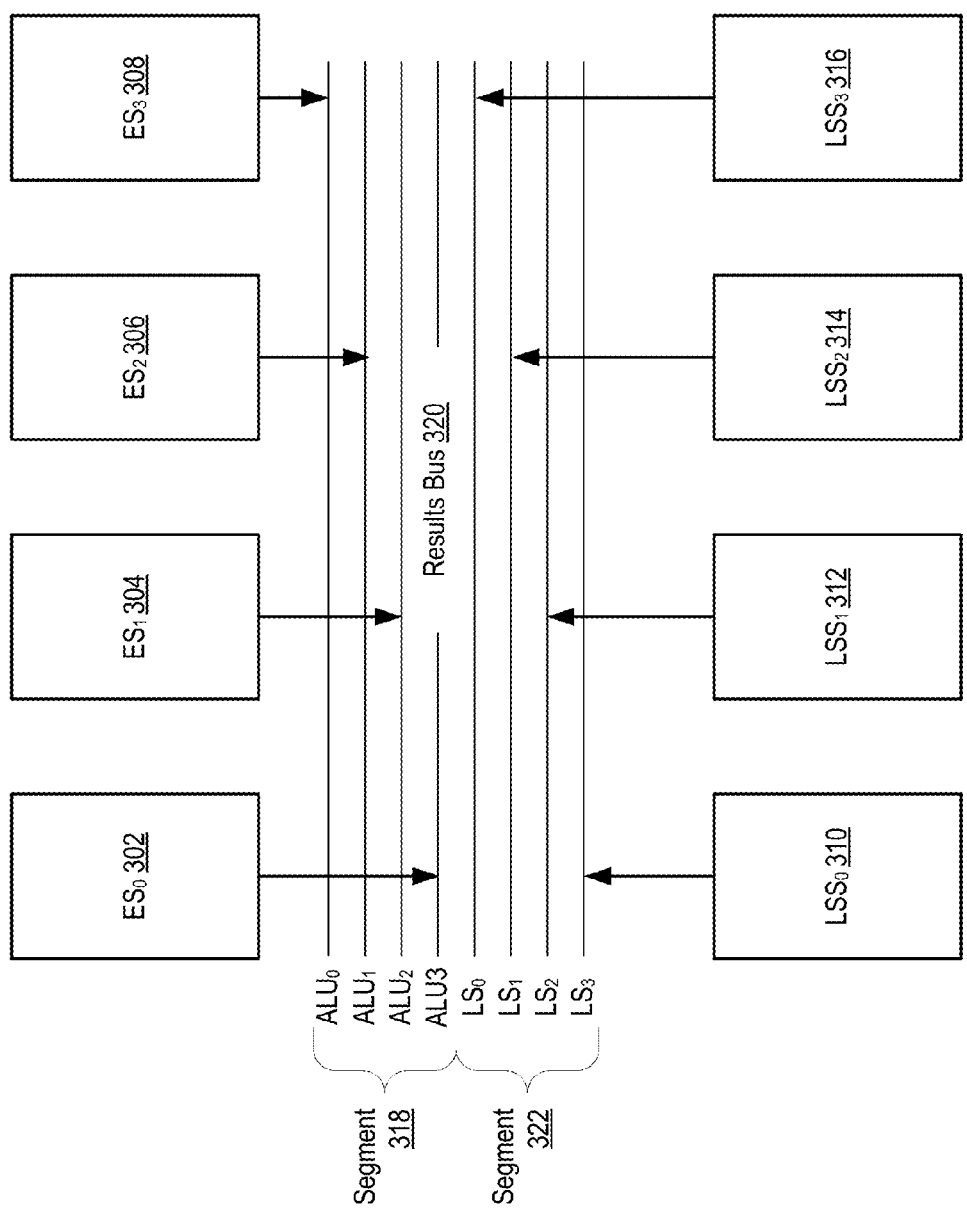
FIG. 3 sets forth a block diagram of another example multi-slice processor configured for operation in accordance with embodiments of the present invention.

For further explanation, FIG. 3 sets forth a block diagram of another example multi-slice processor configured for operation in accordance with embodiments of the present invention. The example multi-slice processor of FIG. 3 is similar to the multi-slice processor in the example of FIG. 2 in that the multi-slice processor of FIG. 3 includes a plurality of execution unit slices (302, 304, 306, 308) and a plurality of load/store slices (310, 312, 314, 316) coupled to one another through a results bus (330).

The results bus (330) in the example multi-slice processor in of FIG. 3 includes a plurality of segments (318, 322). Each segment is assigned to carry results of a particular instruction type. One segment (318) is configured to carry results of arithmetic execution instruction types—vector arithmetic instructions, scalar arithmetic instructions, and the like. One segment (322) is configured to carry results of load/store instruction types.

In the example of FIG. 3 a dispatcher (such as the dispatch routing network of FIG. 1) may provide, to an execution slice (such as $ES_0$), a producer instruction. A producer instruction is an instruction that when executed produces a result required for execution of another instruction, a source instruction. The execution slice $ES_0$ (302) may receive, along with the producer instruction an identifier of an instruction type and an identifier of the producer instruction. An identifier of an instruction may be referred to as an ITAG. The execution slice may store the identifier of the instruction type and the identifier of the producer instruction in an entry of a register, such as a general purpose register. The entry of the register in which the ITAG of the producer and the instruction type is stored may be indexed by a logical register included as a parameter of the producer instruction. As explained above, if another instruction enters the general purpose register at the same entry, the producer instruction information (the ITAG and instruction type) may be relocated to the history buffer along with the logical register targeted by the producer instruction.

The same execution slice, or a different execution slice, may then receive, from the dispatcher, a source instruction, where the source instruction is dependent upon the result of the producer instruction. Consider for example that the same execution slice, $ES_0$ (302) receives the source instruction. $ES_0$ may store the source instruction in, an issue queue (such as a queue implemented in the execution reservation station of FIG. 1) along with the ITAG of the producer instruction and the producer instruction's type. $ES_0$ may retrieve the ITAG of the producer and the producer instruction type from the register entry of the producer instruction by utilizing the logical register value included in the source instruction as an index into the register. The logical register value of the source instruction is the same value of the logical register value of the producer instruction.

The register in which the parameters for the producer instruction are stored may be configured to snoop the results bus for the ITAG of the producer instruction. That is, when results are placed on the bus by an execution slice or a load/store slice, the results are broadcast on the bus with the ITAG of the instruction that produced the results. By snooping the bus for the ITAG of the producer instruction, the register may identify the results on the bus as belonging to the producer instruction and copy the results from the bus into a portion of register entry for the producer instruction dedicated to storing the results. In the example of FIG. 3, the register need not snoop the ITAG of the producer from each of the bus lines, but rather only on the segment assigned to carry the results of the type of the producer instruction. Consider, for example, that the producer instruction is a store instruction type. Thus, the register need only snoop $LS_0$-$LS_3$ for the producer's ITAG and can ignore all other bus lines. Because each bus line may be carrying many results over time and snooping requires a power-consuming comparison, reducing the number of such comparisons by limiting the number of bus lines upon which the register must snoop the producer ITAG results in a reduced power consumption to retrieve the results of the of the producer instruction.

In a similar manner, while the source instruction is in the issued queue waiting to be issued, the issue queue is configured to snoop the producer's ITAG from the results bus. Once an ITAG on the issue matches the producer's ITAG, the issue queue may issue the source instruction from the issue queue to be executed. In the example of FIG. 3, the issue queue may snoop the producer ITAG only from the segment of the bus assigned to carry results of the producer's instruction type, rather than snooping the producer ITAG from on all bus lines of the result bus. As above, each comparison of the producer's ITAG to an ITAG presented on the results bus consumes power and each of the results bus lines may carry many results over time. As such, reducing the number of comparisons by the issue queue by reducing the number of bus lines on which to snoop generally results in reduced power consumption relative to snooping all ITAGs presented on all bus lines.

In some embodiments, the results bus (320) may be further segmented by the slice identifier. In such an embodiment a portion of each segment (in this example a single bus line) may be assigned to carry results of a particular instruction type for a particular slice. The bus line $ALU_0$, for example, may be configured to carry results of arithmetic instruction types only for instructions executed by, not necessarily issued by, by slice 0. The bus line, $LS_1$, as another example may be configured to carry only results of load/store instruction types executed by slice 1. In such embodiments, the entry in the register for the producer instruction may include, in addition to the instruction type of the producer instruction, the identifier of the slice to which the producer instruction was issued for execution.

Further, in such embodiments, the issue queue and the register storing the producer instruction parameters may snoop only the portion of the segment of the results bus assigned to carry results of the particular instruction type and assigned to carry results from the slice to which the producer instruction was issued for execution. Consider, for example, that a producer instruction of a load type is issued by $ES_0$ (302) for execution by $LSS_1$ (312). Rather than snooping the entire segment (322) assigned to carry such load/store results, the issue queue and register may snoop only the portion of that segment assigned to carry results executed by $LSS_1$ (312). In this example, such results are carried only a single bus line, $LS_1$. Here, rather than snooping all eight bus lines, or even the four bus lines of the segment (322) assigned to carry results of the load/store instruction types, the issue queue and register need only snoop the producer ITAG from a single bus line, thus further reducing power consumption incurred by comparisons of ITAGs presented on the results bus to the producer ITAG.

Figure 4:
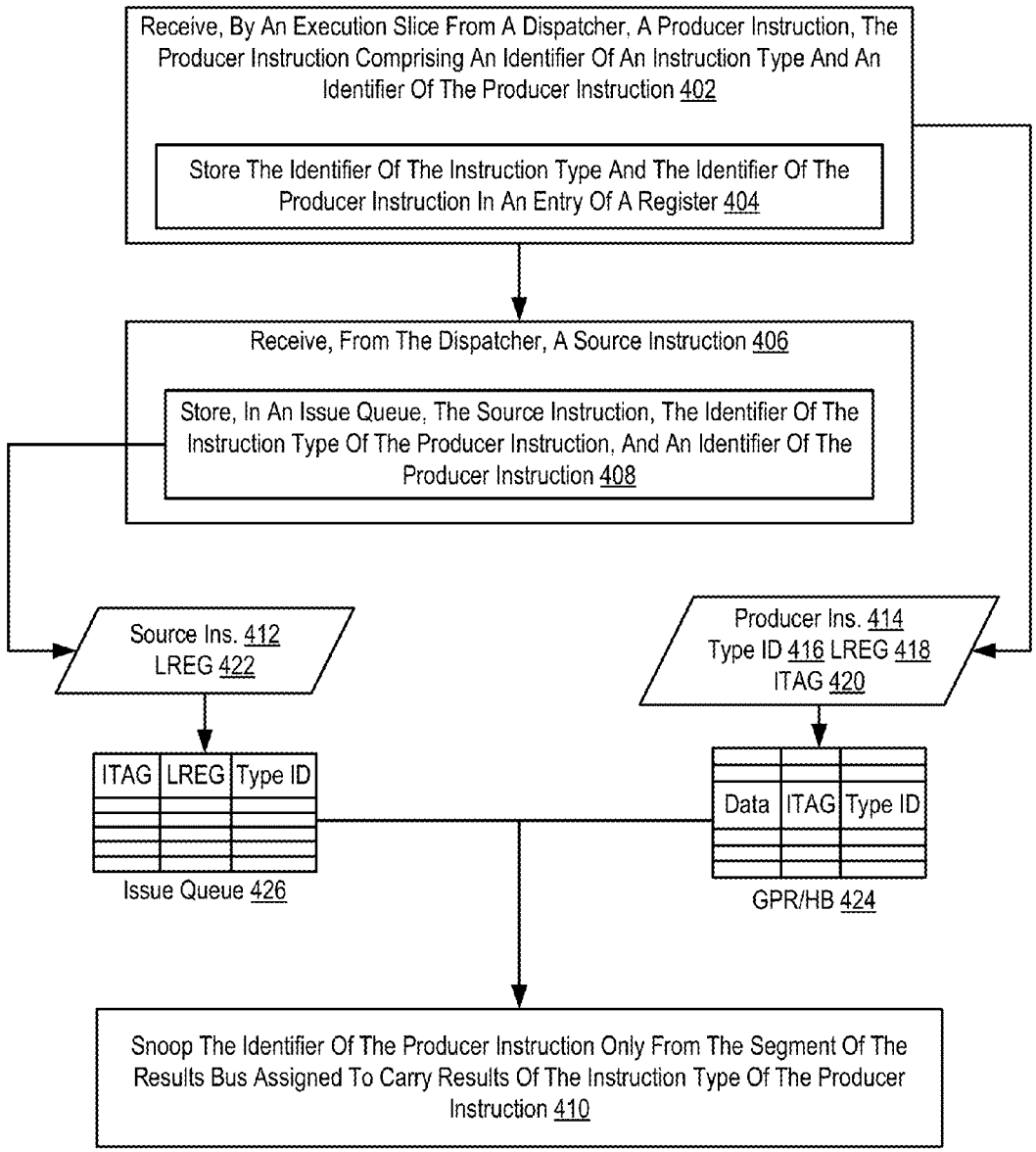
FIG. 4 sets forth a flow chart illustrating an exemplary method for operation of a multi-slice processor according to embodiments of the present invention.

For further explanation, FIG. 4 sets forth a flow chart illustrating an exemplary method for operation of a multi-slice processor according to embodiments of the present invention. The multi-slice processor operating in the example method of FIG. 4 is similar to the multi-slice processor of FIG. 2 including as it does, a plurality of execution slices and a plurality of load/store slices, where the load/store slices are coupled to the execution slices via a results bus and the results bus comprises a plurality of segments with each segment assigned to carry results of a different instruction type.

The method of FIG. 4 includes receiving (402), from a dispatcher, a producer instruction (414). In the method of FIG. 4, the producer instruction includes an identifier of an instruction type (416) and an identifier of the producer instruction (420). The producer instruction may also include a logical register (418) identifying the target of the instruction. Also in the method of FIG. 4, receiving the producer instruction includes storing (404) the identifier of the instruction type and the identifier of the producer instruction in an entry of a register such as general purpose register (424).

The method of FIG. 4 also includes receiving (406), from the dispatcher, a source instruction (412). In the method of FIG. 4, the source instruction (412) is dependent upon the result of the producer instruction (414) and receiving (406) the source instruction includes storing (408), in an issue queue (426), the source instruction (412), the identifier (416) of the instruction type of the producer instruction, and an identifier (420) of the producer instruction. Storing the identifier of the instruction type and the identifier of the producer instruction in the issue queue (426) may be carried out by copying the information from the register (424) entry in which the producer instruction parameters are stored by utilizing a logical register (422) included in the source instruction as an index into the register (424).

The method of FIG. 4 also includes snooping (410) the identifier (420) of the producer instruction only from the segment of the results bus assigned to carry results of the instruction type of the producer instruction. Such snooping may be carried out by first multiplexing out other segments and then comparing each result presented on the segment of the result bus assigned to carry results of the instruction type with the identifier of the producer instruction.

Figure 5:
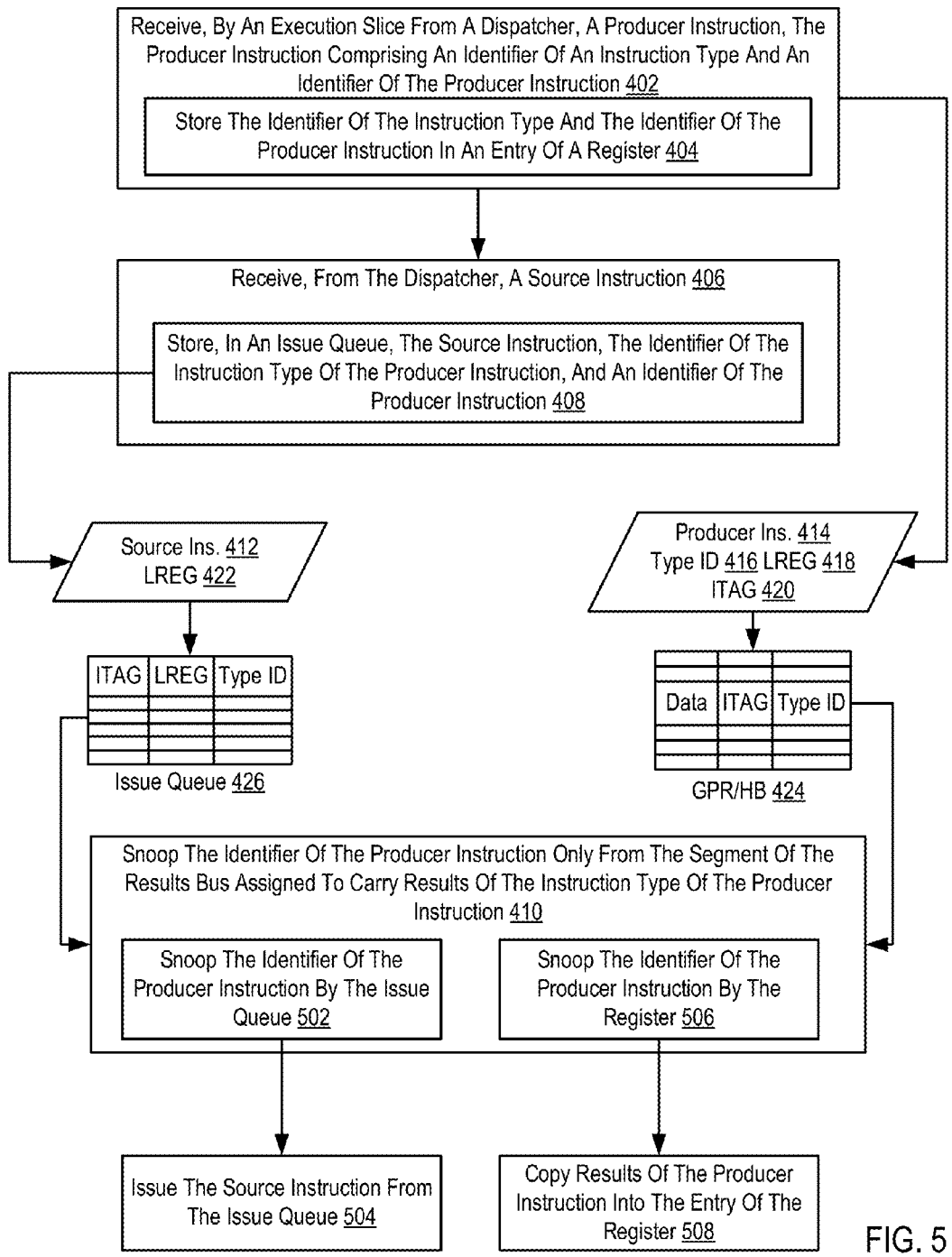
FIG. 5 sets forth a flow chart illustrating an exemplary method for operation of a multi-slice processor according to embodiments of the present invention.

For further explanation, FIG. 5 sets forth a flow chart illustrating an exemplary method for operation of a multi-slice processor according to embodiments of the present invention. The multi-slice processor operating in the example method of FIG. 5 is similar to the multi-slice processor of FIG. 2 including as it does, a plurality of execution slices and a plurality of load/store slices, where the load/store slices are coupled to the execution slices via a results bus and the results bus comprises a plurality of segments with each segment assigned to carry results of a different instruction type. The method of FIG. 5 is also similar to the method of FIG. 4 in that the method of FIG. 5 also includes receiving (402) a producer instruction, receiving (406) a source instruction, and snooping (410) the identifier of the producer instruction only from the segment of the results bus assigned to carry results of the instruction type of the producer instruction.

The method of FIG. 5 differs from the method of FIG. 4, however, in that, in the method of FIG. 5 snooping (410) the identifier of the producer instruction includes snooping (502) the identifier of the producer instruction by the issue queue and the method includes issuing (504) the source instruction from the issue queue for execution responsive to snooping the identifier of the producer instruction by the issue queue. The result data that includes the producer instructions identifier will be used by the source instruction to issue. That is, when the source instruction issues, the result data presented on the bus as a result of the producer instruction may be provided to an ALU or load/store slice for execution of the source instruction. The data included in the results presented on the results bus for which the identifier of the producer instruction is snooped by the issue queue may propagate to an ALU or a load/store slice in one of several ways. For example, the result may be copied off the result bus into the issue queue itself and passed to the ALU or load/store slice upon instruction or the issue queue may issue the source instruction to an ALU or load/store slice and indicate to those units from which results bus to retrieve the results data of the producer instruction (the source data).

Also in the method of FIG. 5, snooping (410) the identifier of the producer instruction includes snooping (506) the identifier of the producer instruction by the register (424) in which the producer instruction parameters are stored and the method includes copying (508) results of the producer instruction into the entry of the register responsive to snooping the identifier of the producer instruction by the register. Such results may be copied into a portion (labeled 'Data' in FIG. 5) of the entry of the register in which the producer instruction parameters are stored.

Figure 6:
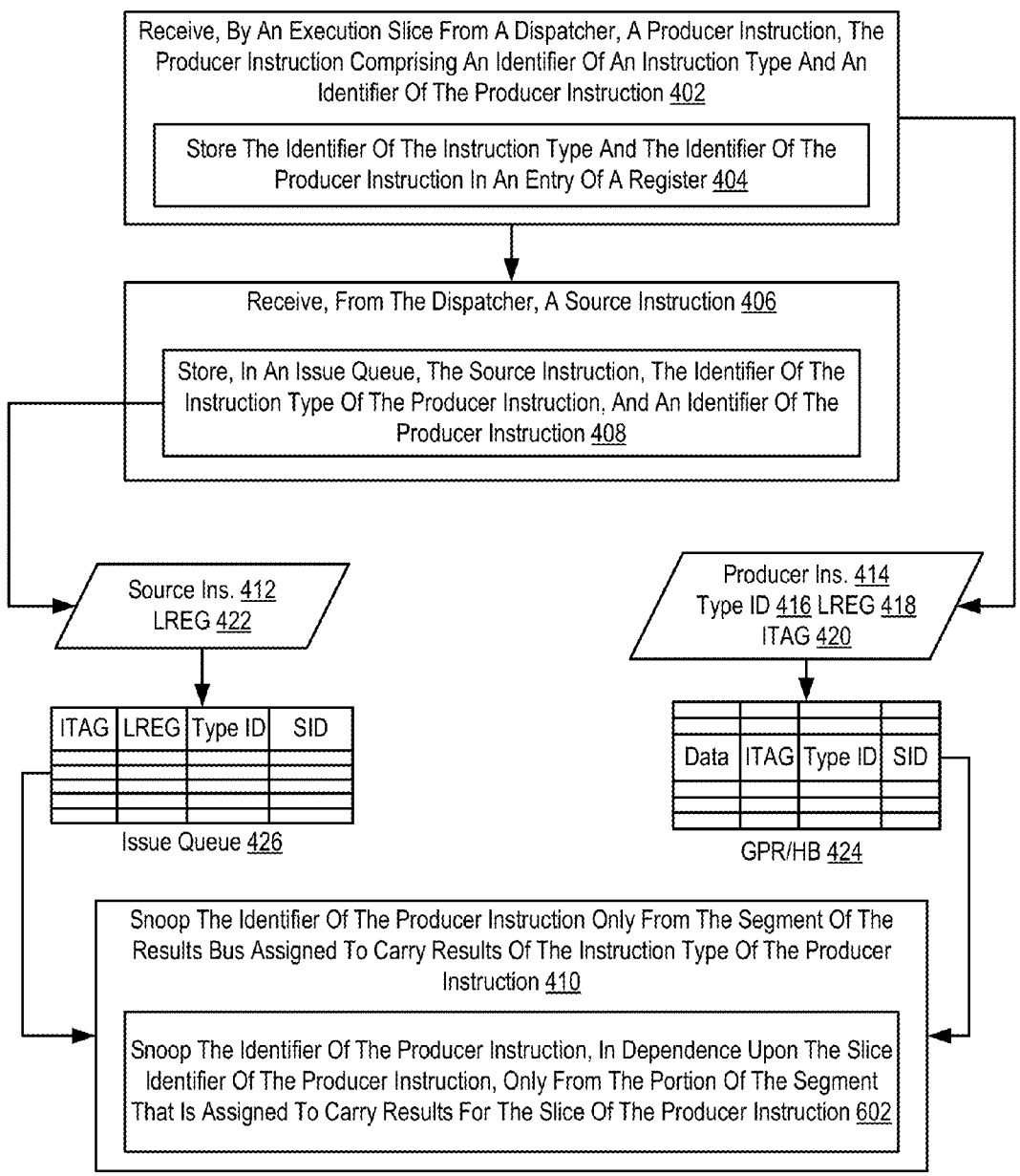
FIG. 6 sets forth a flow chart illustrating an exemplary method for operation of a multi-slice processor according to embodiments of the present invention.

For further explanation, FIG. 6 sets forth a flow chart illustrating an exemplary method for operation of a multi-slice processor according to embodiments of the present invention. The multi-slice processor operating in the example method of FIG. 6 is similar to the multi-slice processor of FIG. 2 including as it does, a plurality of execution slices and a plurality of load/store slices, where the load/store slices are coupled to the execution slices via a results bus and the results bus comprises a plurality of segments with each segment assigned to carry results of a different instruction type. The method of FIG. 6 is also similar to the method of FIG. 4 in that the method of FIG. 6 also includes receiving (402) a producer instruction, receiving (406) a source instruction, and snooping (410) the identifier of the producer instruction only from the segment of the results bus assigned to carry results of the instruction type of the producer instruction.

The method of FIG. 6 differs from the method of FIG. 4, however, in that in the method of FIG. 6, the producer instruction also includes a slice identifier. The slice identifier may be implemented as the slice identifier of the slice to which the producer instruction is issued for execution. That is, the slice identifier may indicate the slice from which the results of the execution of the producer instruction will be returned. The slice identifier may be stored in the register (424) by the issue queue upon issuance or may be included as a parameter from the dispatcher.

In such embodiments, portions of each segment of the results bus may be further assigned to carry results only for a different one or more slices of the multi-slice identifier. That is, each segment may be assigned to carry results of a particular instruction type and portions within each segment may be further assigned to carry results only from a particular slice.

In the method of FIG. 6, snooping (410) the identifier of the producer instruction only from the segment of the results bus assigned to carry results of the instruction type of the producer instruction may also include snooping (602) the identifier of the producer instruction, in dependence upon the slice identifier of the producer instruction, only from the portion of the segment that is assigned to carry results for the identified slice executing the producer instruction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices and a plurality of load/store slices, wherein the load/store slices are coupled to the execution slices via a results bus and the results bus comprises a plurality of segments with each segment assigned to carry results of a different instruction type, the method comprising:
   receiving, from a dispatcher, a producer instruction, wherein the producer instruction comprises an identifier of an instruction type and an identifier of the producer instruction wherein receiving the producer instruction further comprises storing the identifier of the instruction type and the identifier of the producer instruction in a first portion of an entry of a register;
   receiving, from the dispatcher, a source instruction, wherein the source instruction is dependent upon the result of the producer instruction and receiving the source instruction includes storing, in an issue queue, the source instruction, the identifier of the instruction type of the producer instruction, and an identifier of the producer instruction; and
   snooping the identifier of the producer instruction only from the segment of the results bus assigned to carry results of the instruction type of the producer instruction.

2. The method of claim 1 wherein snooping the identifier of the producer instruction only from the segment of the results bus assigned to carry results of the instruction type of the producer instruction further comprises snooping the identifier of the producer instruction by the issue queue; and the method further comprises:
   responsive to snooping the identifier of the producer instruction by the issue queue, issuing the source instruction from the issue queue.

3. The method of claim 1 wherein snooping the identifier of the producer instruction only from the segment of the results bus assigned to carry results of the instruction type of the producer instruction further comprises snooping the identifier of the producer instruction by the register; and the method further comprises:
   responsive to snooping the identifier of the producer instruction by the register, copying results of the producer instruction into a second portion of the entry of the register.

4. The method of claim 1 wherein:
the instruction type of the producer comprises an arithmetic execution instruction type.

5. The method of claim 1 wherein:
the instruction type of the producer comprises a load instructions type.

6. The method of claim 1 wherein:
the producer instruction further comprises a slice identifier;
portions of each segment of the results bus are assigned to carry results only for a different one or more slices of the multi-slice processor; and
snooping the identifier of the producer instruction only from the segment of the results bus assigned to carry results of the instruction type of the producer instruction further comprises snooping the identifier of the producer instruction, in dependence upon the slice identifier of the producer instruction, only from the portion of the segment that is assigned to carry results for the identified slice of the producer instruction.

7. The method of claim 1 wherein:
each execution slice includes an instruction queue, a general purpose register, a history buffer, and an arithmetic execution unit, wherein each execution slice is associated with a load/store slice to form a single slice of the multi-slice processor.

* * * * *